United States Patent
Wu

(10) Patent No.: US 11,618,630 B2
(45) Date of Patent: Apr. 4, 2023

(54) NET CHAIN DRIVING STRUCTURE

(71) Applicant: Xiang Wu, Yangzhou (CN)

(72) Inventor: Xiang Wu, Yangzhou (CN)

(*) Notice: Subject to any disclaimer, the term of this patent is extended or adjusted under 35 U.S.C. 154(b) by 30 days.

(21) Appl. No.: 17/497,986

(22) Filed: Oct. 11, 2021

(65) Prior Publication Data
US 2022/0024692 A1 Jan. 27, 2022

Related U.S. Application Data

(63) Continuation of application No. PCT/CN2020/101919, filed on Jul. 14, 2020.

(30) Foreign Application Priority Data

Jun. 10, 2020 (CN) .......................... 202010521225.7
Jun. 10, 2020 (CN) .......................... 202021051509.6

(51) Int. Cl.
| | | |
|---|---|---|
| *B65G 17/08* | (2006.01) | |
| *B65G 15/48* | (2006.01) | |
| *B65G 17/40* | (2006.01) | |
| *B65G 23/06* | (2006.01) | |

(52) U.S. Cl.
CPC .............. *B65G 17/08* (2013.01); *B65G 15/48* (2013.01); *B65G 17/40* (2013.01); *B65G 23/06* (2013.01)

(58) Field of Classification Search
CPC ......... F16G 13/04; B65G 17/08; B65G 15/48; B65G 17/40; B65G 23/06
USPC ...................................................... 198/834
See application file for complete search history.

(56) References Cited

U.S. PATENT DOCUMENTS

| | | | | |
|---|---|---|---|---|
| 2,024,846 A * | 12/1935 | Burgess | ............... | B65G 17/086 |
| | | | | 198/850 |
| 3,174,617 A * | 3/1965 | Noffsinger | ........... | B65G 17/063 |
| | | | | 198/851 |
| 4,179,024 A * | 12/1979 | Boersma | ................ | B65G 23/22 |
| | | | | 198/806 |
| 5,083,659 A * | 1/1992 | Bode | ...................... | B65G 17/08 |
| | | | | 198/853 |
| 5,490,591 A | 2/1996 | Faulkner | | |
| | (Continued) | | | |

FOREIGN PATENT DOCUMENTS

| | | |
|---|---|---|
| CN | 1785767 A | 6/2006 |
| CN | 101360669 A | 2/2009 |
| | (Continued) | |

*Primary Examiner* — James R Bidwell
(74) *Attorney, Agent, or Firm* — Bayramoglu Law Offices LLC

(57) ABSTRACT

A net chain driving structure includes a conveying net chain. The conveying net chain includes a plurality of chain links successively inserted in a conveying direction, a plurality of lugs spaced apart from each other are arranged on two sides of the chain links, an end portion of the lug is an arcuate face, a meshing groove is disposed on the chain link, the meshing groove is spliced by an open slot provided on a back side of the chain link and the lugs on the adjacent chain links, a gear in transmission meshing with the meshing groove is disposed on each end of the conveying net chain, a tangent plane tangential to the arcuate face is disposed on the arcuate face of the lug, and transmission contact toothed surfaces of the tangent plane and the gear are attached to each other in parallel during meshing transmission.

8 Claims, 5 Drawing Sheets

(56) References Cited

U.S. PATENT DOCUMENTS

| | | | | |
|---|---|---|---|---|
| 5,791,455 A | * | 8/1998 | Clopton | B65G 17/24 198/779 |
| 8,016,100 B2 | * | 9/2011 | Cornelissen | B65G 17/08 198/853 |
| 2002/0011401 A1 | * | 1/2002 | Damkjaer | B65G 17/08 198/834 |
| 2003/0017896 A1 | * | 1/2003 | Markley | F16H 55/30 474/213 |
| 2007/0272523 A1 | | 11/2007 | Vietoris | |
| 2017/0073166 A1 | * | 3/2017 | Soderstrom | B65G 23/06 |

FOREIGN PATENT DOCUMENTS

| | | | |
|---|---|---|---|
| CN | 203009697 U | 6/2013 | |
| CN | 106415075 A | 2/2017 | |
| CN | 109625776 A | 4/2019 | |
| GB | 2352220 * | 1/2001 | B65G 17/08 |

* cited by examiner

--Prior Art--

--Prior Art--

NET CHAIN DRIVING STRUCTURE

CROSS REFERENCE TO THE RELATED APPLICATIONS

This application is a continuation application of the International Application No. PCT/C N2020/101919, filed on Jul. 14, 2020, which is based upon and claims priority to Chinese Patent Application No. 202010521225.7 and 202021051509.6, filed on Jun. 10, 2020, the entire contents of which are incorporated herein by reference.

TECHNICAL FIELD

The present invention relates to the technical field of conveying devices, and specifically, to a net chain driving structure.

BACKGROUND

As shown in FIG. 6 and FIG. 7, an existing conveying net chain includes a plurality of chain links 8 successively inserted in a conveying direction. Lugs 9 that are arranged at equal intervals are disposed on two sides of each of the chain links. The lugs 9 of adjacent chain links 8 are in a staggered arrangement and rotatably connected by using a rotary shaft 10. An end portion of the lug 9 is an arcuate face. A meshing groove 11 is respectively disposed on each of the chain links 8. As the meshing groove 11 is spliced by an open slot disposed on the back side of the chain link and the lug 9 on adjacent chain links on the side of the conveying direction, transmission teeth of a gear 12 and the lugs 9 are in line contact during transmission, causing a position of the transmission teeth of a gear 11 in contact with the lugs 9 to be constantly changed. When the gear 12 rotates to a vertex angle of the transmission tooth to contact with the lugs 9, the lugs 9 are subjected to an upward inclined force in the conveying direction, so as to make the conveying surface of the conveying net chain jump, thereby affecting the conveying effect and service life of the conveying net chain.

SUMMARY

An objective of the present invention is to provide a net chain driving structure, so as to effectively resolve problems in the background art, guarantee the stable conveying of a net chain and effectively prolong the service life of the net chain.

A technical solution for implementing the above objective is to provide a net chain driving structure. The net chain driving structure includes a conveying net chain, where the conveying net chain includes a plurality of chain links successively inserted in a conveying direction, lugs that are arranged at an equal interval are provided on two sides of each of the chain links, the lugs of adjacent chain links are in a staggered arrangement and rotatably connected by using a rotary shaft, an end portion of each of the lugs is an arcuate face, a meshing groove is formed between the lug of the chain link and adjacent chain links, a gear in transmission meshing with the meshing groove is disposed on two ends of the conveying net chain, a tangent plane tangential to the arcuate face is disposed on the arcuate face of the lug, and a transmission contact toothed surface of the tangent plane and the gear are attached to each other in parallel during meshing transmission.

Beneficial effects of the present invention are as follows:

By means of the present invention, tangent planes are disposed on the lugs of the chain links, and the transmission contact toothed surfaces of the tangent planes and the gears are attached to each other in parallel during meshing transmission. A change in the tangent planes and the gears is merely a change in a size of a contact area, which does not result in fluctuation of a conveying face of the conveying net chain. In this way, a conveying effect is effectively improved and a service life of the net chain is prolonged.

Further, metal sheets are connected to two adjacent rotary shafts. Through the arrangement of the metal sheet, the metal sheet is driven, by using the rotary shaft, to indirectly pull adjacent rotary shafts and the chain links to convey forward while the gear drives the chain link to convey forward, which reduces the stress of the chain link during conveying, and prolongs the service life of the chain link.

Further, a plurality of pairs of meshing grooves that are equidistantly arranged are disposed on the back side of the chain links, each pair of meshing grooves includes two meshing grooves that are in communication with each other, and a plurality of metal sheets are disposed on the two adjacent rotary shafts, and the metal sheets are respectively disposed between the corresponding two meshing grooves that are in communication with each other.

Through the reasonable arrangement of the meshing grooves and the metal sheets, the conveying of the conveying net chain can be more labor-saving and smoother.

Further, penetration holes matching a diameter of the rotary shaft are disposed on two ends of each of the metal sheets, and the metal sheets are sleeved on the two adjacent rotary shafts by using the penetration holes on the two ends, so that the metal sheets can be used to play the role of limiting pitches of the transmission net chain. The chain links cannot play the role, further reducing the stress of the chain links during transmission.

Further, an accommodation slot configured to accommodate the metal sheet are disposed on the conveying net chain, and the metal sheet is matedly disposed in the corresponding accommodation slot, so as to guarantee the flatness of the conveying surface of the conveying net chain.

Further, the metal sheet is made of stainless steel having a surface processed by means of hardening, and the stainless steel has good hardness and corrosion resistance.

Further, two side walls of each of the meshing grooves in a width direction of the chain link are disposed as inclined faces inclined outward.

By means of the present invention, two inner side walls of each of the meshing grooves are designed as an inclined plane, so as to increase sizes of external openings of the meshing grooves, facilitating smooth meshing of the gears and the meshing grooves.

Further, the bottom of the meshing groove is mated with the tooth width of the gear, so that the gear can be tightly engaged with the meshing groove during the meshing transmission.

DETAILED DESCRIPTION OF THE EMBODIMENTS

Figure 1:
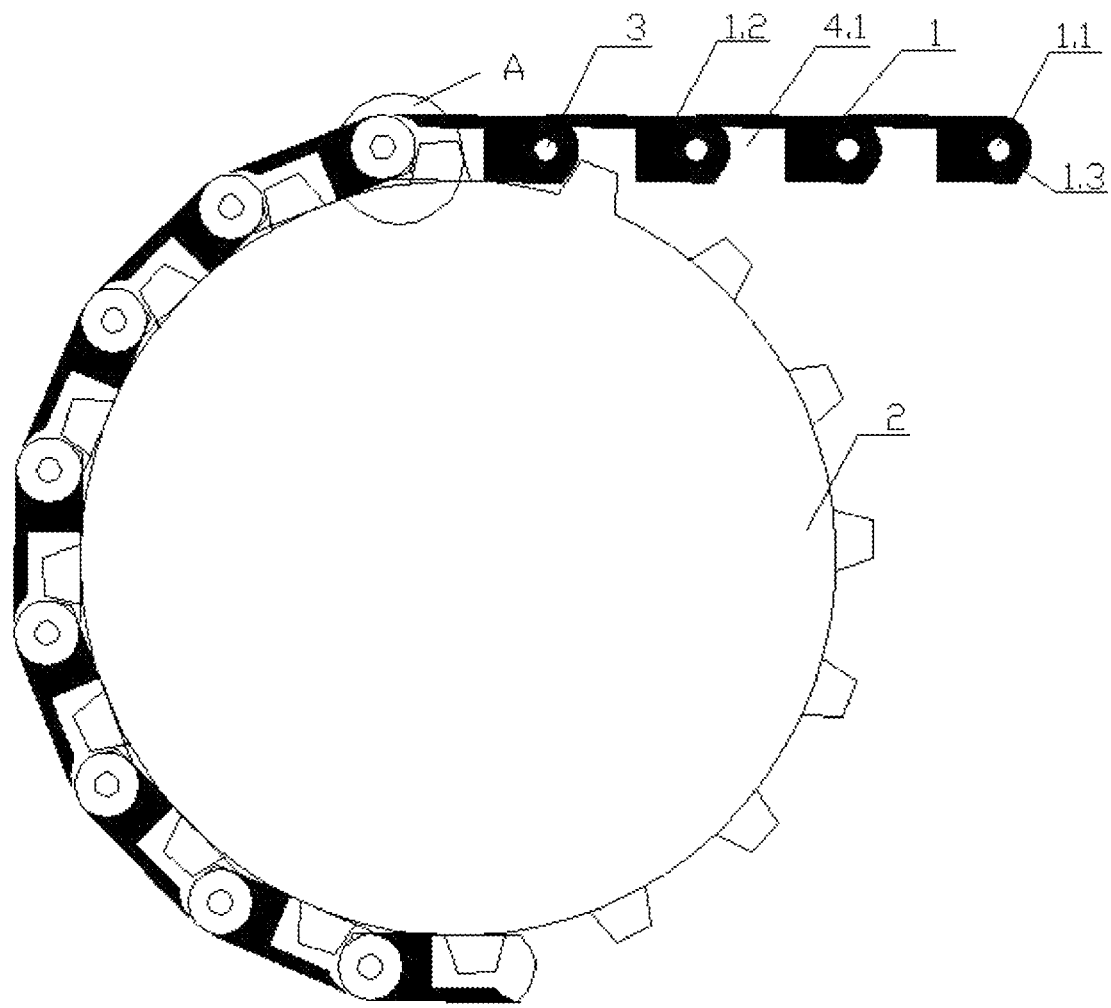
FIG. 1 is a schematic structural diagram of the present invention.
Figure 2:
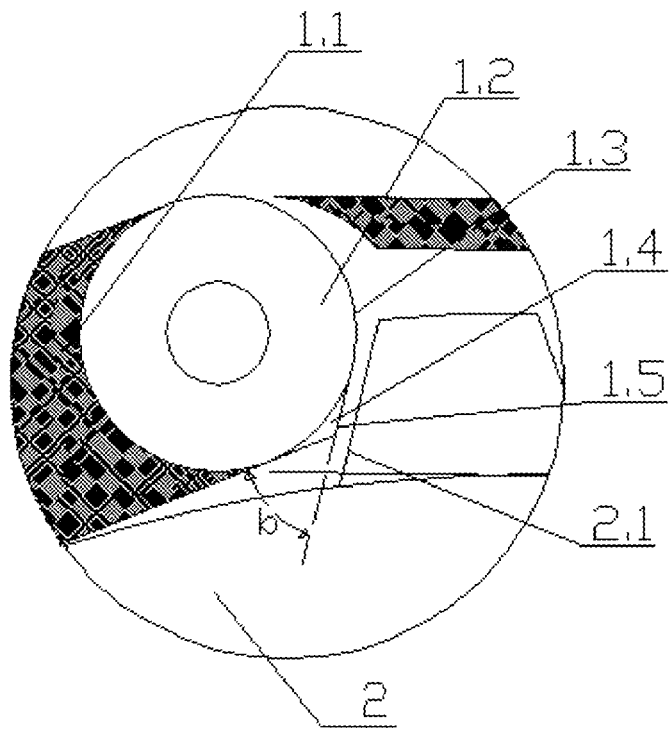
FIG. 2 is a partial enlarged view of a part A in FIG. 1.
Figure 3:
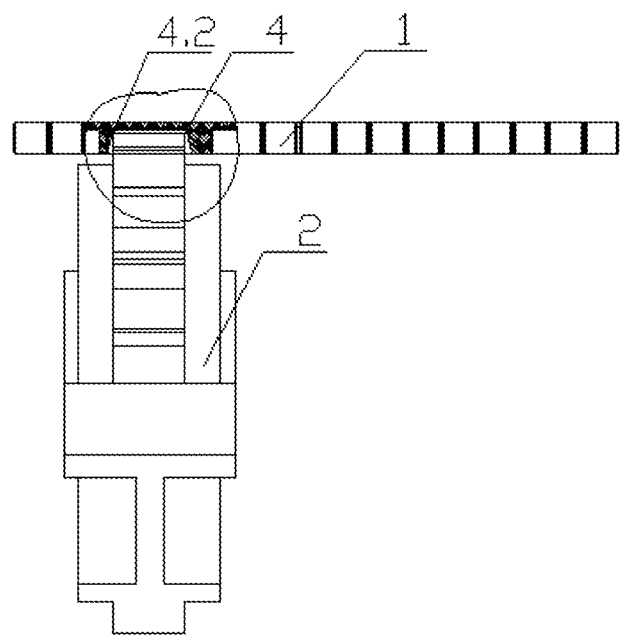
FIG. 3 is a schematic diagram of a structure gears meshed with gear teeth.
Figure 4:
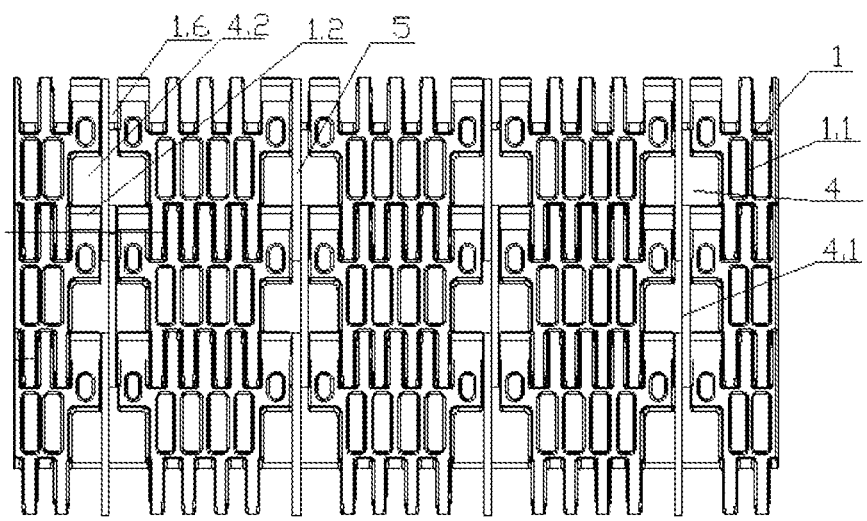
FIG. 4 is a bottom view of a conveying net chain.
Figure 5:
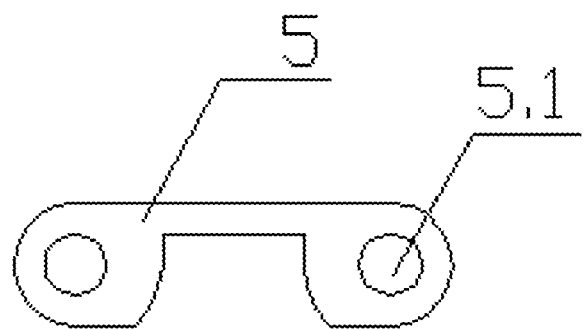
FIG. 5 is a schematic structural diagram of metal sheets.
Figure 6:
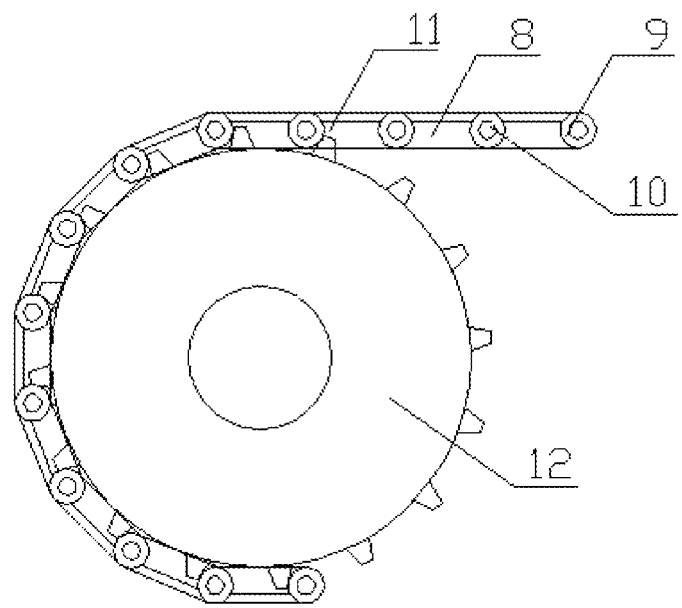
FIG. 6 is a schematic structural diagram of the prior art.
Figure 7:
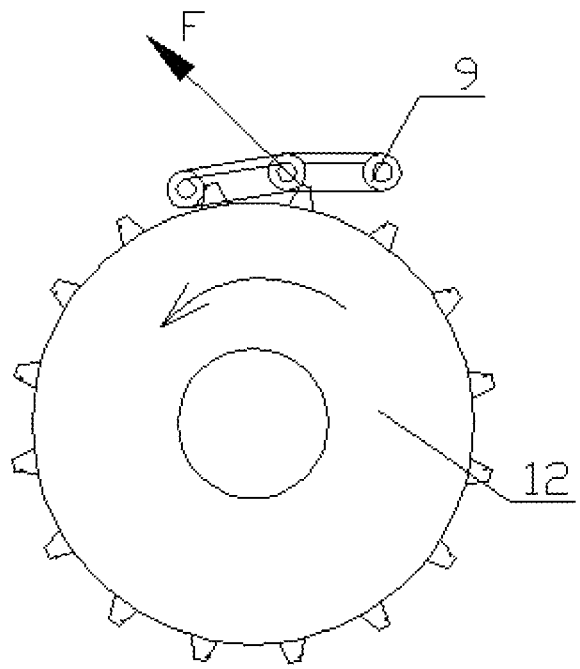
FIG. 7 is a schematic diagram of force analysis of an existing net chain during conveying.

As shown in FIG. 1 to FIG. 5, the present invention includes a conveying net chain 1. The conveying net chain 1 includes a plurality of chain links 1.1 successively inserted in a conveying direction. A plurality of lugs 1.2 are provided on two sides of each of the chain links 1.1, and the lugs 1.2 of adjacent chain links 1.1 are in a staggered arrangement and rotatably connected by using a rotary shaft 3. An end portion of each of the lugs 1.2 is an arcuate face 1.3. A plurality of pairs of meshing grooves 4 that are equidistantly arranged are disposed on back sides of the chain links 1.1, and each pair of meshing grooves 4 includes two meshing grooves 4.1 that are in communication with each other. The meshing groove 4.1 is spliced by an open slot 4.2 disposed on the back side of the chain link and the lugs 1.2 on the adjacent chain links 1.1 on one side of conveying direction.

Gears 2 respectively meshed with the meshing grooves 4.1 on the back sides of the chain links 1.1 are disposed on the two ends of the conveying net chain 1. A protrusion 1.4 is disposed on the arcuate face 1.3 of the lugs 1.2. A tangent plane 1.5 tangential to the arcuate face 1.3 is provided on the protrusion 1.4. The tangent plane 1.5 on the protrusion 1.3 and the transmission contact toothed surface 2.1 of the gear 2 are attached to each other in parallel during meshing transmission. Through the arrangement of the tangent plane 1.5 on the protrusion 1.3, the gear 2 and the lug 1.2 are always in surface contact with each other during transmission, thereby avoiding a change in the stress direction change of a conveying net chain caused by line contact between a vertex angle of a gear drive tooth and a lug in the background art. The change in the tangent plane 1.5 on the protrusion 1.3 and the transmission contact toothed surface 2.1 of the gear 2 is merely a change in the size of a contact area, not causing fluctuation of the conveying surface of the conveying net chain 1. In this way, a conveying effect is effectively improved and a service life of the net chain is prolonged.

As a further description of this embodiment, different angles b of the tangent plane 1.5 of the conveying net chain need to be designed according to the change in a number of teeth of mating gears, so as to ensure smooth meshing and disengagement of the net chain, and guarantee outward thrust of the angles of the toothed surfaces on the chain. In some optional embodiments, a plurality of metal sheets 5 are further connected to two adjacent rotary shafts 2. The metal sheet 5 is made of stainless steel having a surface processed by means of hardening. The metal sheets 5 are disposed between corresponding two meshing grooves 4.1 that are in communication with each other. An accommodation slot 1.6 configured to accommodate the metal sheet 5 is disposed on the conveying net chain 1, and the metal sheet 5 is matedly disposed in the corresponding accommodation slot 1.6.

In this embodiment, through the arrangement of the metal sheets 5, the metal sheets 5 are driven, by using the rotary shaft 3, to indirectly pull adjacent rotary shafts 3 and the chain link 1.1 to convey forward while the gears 2 drive the chain link 1.1 to convey forward, which reduces the stress of the chain link 1.1 during conveying, and prolongs the service life of the chain link 1.1.

In some optional embodiments, penetration holes 5.1 matching a diameter of the rotary shaft 2 are disposed on two ends of each of the metal sheets 5, and the metal sheets 5 are sleeved on the two adjacent rotary shafts 2 by using the penetration holes 5.1 on the two ends, so that the metal sheet 5 can play the role of limiting pitches of a net chain 1. The chain link 1.1 does not play the role, further reducing the stress of the chain link 1.1 during transmission.

In some optional embodiments, two side walls of each of the meshing grooves 4 in the width direction of the chain link 1.1 are disposed as inclined planes 4.2 inclined outward, so as to increase the sizes of external openings of the meshing groove, and facilitate smooth meshing of the gear 2 and the meshing groove 4.

In some optional embodiments, the bottom of the meshing groove 4.1 is designed to mate with the tooth width of the gear 2, so as to cause the gear 2 to be tightly meshed with the meshing groove 4.1 during meshing transmission.

What is claimed is:

1. A net chain driving structure, comprising a conveying net chain, wherein the conveying net chain comprises a plurality of chain links successively inserted in a conveying direction, a plurality of lugs spaced apart from each other are arranged on two sides of the plurality of chain links, lugs of adjacent chain links of the plurality of chain links are in a staggered arrangement and rotatably connected by using a rotary shaft, an end portion of each lug of the plurality of lugs is an arcuate face, a meshing groove is provided on each chain link of the plurality of chain links, the meshing groove is spliced by an open slot provided on a back side of the each chain link and the lugs on the adjacent chain links on one side of the conveying direction, a gear in transmission meshing with the meshing groove is disposed on each of two ends of the conveying net chain, a tangent plane tangential to the arcuate face is disposed on the arcuate face of the each lug, and a transmission contact toothed surface of the tangent plane and a transmission contact toothed surface of the gear are attached to each other in parallel during a meshing transmission.

2. The net chain driving structure according to claim 1, wherein a plurality of metal sheets are connected to two adjacent rotary shafts.

3. The net chain driving structure according to claim 2, wherein a plurality of pairs of meshing grooves equidistantly arranged are disposed on the back side of the each chain link, each pair of the meshing grooves comprises two meshing grooves in communication with each other, the plurality of metal sheets are disposed on the two adjacent rotary shafts, the plurality of metal sheets are respectively disposed between the two meshing grooves in communication with each other.

4. The net chain driving structure according to claim 2, wherein penetration holes matching a diameter of the rotary shaft are disposed on two ends of each of the plurality of metal sheets, and the plurality of metal sheets are sleeved on the two adjacent rotary shafts by using the penetration holes on the two ends.

5. The net chain driving structure according to claim 2, wherein accommodation slots configured to accommodate the plurality of metal sheets are provided on the conveying net chain, and the plurality of metal sheets are matedly disposed in the accommodation slots.

6. The net chain driving structure according to claim 2, wherein the plurality of metal sheets are made of stainless steel having a surface processed by hardening.

7. The net chain driving structure according to claim 1, wherein two side walls of the meshing groove in a width direction of the each chain link are disposed as inclined faces inclined outward.

8. The net chain driving structure according to claim 7, wherein a bottom of the meshing groove is meshed with a tooth width of the gear.

\* \* \* \* \*